(12) United States Patent
Fan et al.

(10) Patent No.: US 9,505,628 B2
(45) Date of Patent: Nov. 29, 2016

(54) FENTON REAGENT IMPROVED CYANATION AND USAGE THEREOF

(71) Applicant: Zhejiang University, Hangzhou (CN)

(72) Inventors: Jie Fan, Hangzhou (CN); Wuzhong Yi, Hangzhou (CN); Renhong Li, Hangzhou (CN); Shihui Zou, Hangzhou (CN); Liping Xiao, Hangzhou (CN); Linfang Lu, Hangzhou (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 0 days.

(21) Appl. No.: 15/031,197

(22) PCT Filed: Oct. 27, 2014

(86) PCT No.: PCT/CN2014/089561
§ 371 (c)(1),
(2) Date: Apr. 21, 2016

(87) PCT Pub. No.: WO2015/062459
PCT Pub. Date: May 7, 2015

(65) Prior Publication Data
US 2016/0251230 A1  Sep. 1, 2016

(30) Foreign Application Priority Data

Oct. 28, 2013 (CN) .......................... 2013 1 0522842
Oct. 23, 2014 (CN) .......................... 2014 1 0571924

(51) Int. Cl.
| | | |
|---|---|---|
| C01C 3/02 | (2006.01) | |
| C01C 3/11 | (2006.01) | |
| C01C 3/08 | (2006.01) | |
| B01J 21/08 | (2006.01) | |

(Continued)

(52) U.S. Cl.
CPC .................. *C01C 3/11* (2013.01); *B01J 21/08* (2013.01); *B01J 23/52* (2013.01); *B01J 23/89* (2013.01);

(Continued)

(58) Field of Classification Search
CPC ............ C01C 3/11; C01C 3/08; B01J 23/52; B01J 21/08; B01J 35/0013; B01J 23/89; C01P 2002/82; C01P 2004/04; C01P 2002/72
USPC ....................................................... 423/372
See application file for complete search history.

(56) References Cited

FOREIGN PATENT DOCUMENTS

| CN | 1032683 | 5/1989 |
| CN | 101250197 | 8/2008 |
| CN | 102274740 | 12/2011 |

OTHER PUBLICATIONS

Li et al, "Radical-Involved Photosynthesis of AuCN Oligomers from Au Nanoparticles and Acetonitrile" J. Am. Chem. Soc. 2012, 134, 18286-18294, Oct. 14, 2012.*

*Primary Examiner* — Colleen Dunn
*Assistant Examiner* — Haytham Soliman
(74) *Attorney, Agent, or Firm* — Tian IP & Technology, LLC.

(57) ABSTRACT

This disclosure provides a facial green method for metal cyanides preparation, including the following steps: 1) supported metal nanoparticles and Fenton's reagent are mixed with nitrile and then stirred to obtain suspension, wherein metal nanoparticles are selected from a nano metal, nano metal oxide and nano metal salt; 2) centrifuging the suspension to obtain a product and drying the product after stirring to obtain the metal cyanides. As prepared metal cyanides have broad application prospects in the fields of sensor, battery, medicine, electroplating and catalysis. This Fenton-improved cyanation (FIC) method may effectively exclude the toxicity from free cyanide anions and get rid of UV-light, being more energy-saving and more feasible for large-scale industrial production of MCs.

13 Claims, 9 Drawing Sheets

(51) Int. Cl.
 *B01J 23/52* (2006.01)
 *B01J 23/89* (2006.01)
 *B01J 35/00* (2006.01)

(52) U.S. Cl.
 CPC .............. *B01J 35/0013* (2013.01); *C01C 3/08* (2013.01); *C01P 2002/72* (2013.01); *C01P 2002/82* (2013.01); *C01P 2004/04* (2013.01)

FENTON REAGENT IMPROVED CYANATION AND USAGE THEREOF

CROSS REFERENCE TO RELATED APPLICATION

This application is a national stage application of International application number PCT/CN2014/089561, filed Oct. 27, 2014, titled "Fenton's reagent improved cyanation and usage thereof," which claims the priority benefit of Chinese Patent Application Nos. 201310522842.9 and 201410571924.7, filed on Oct. 28, 2013 and Oct. 23, 2014, respectively, which is hereby incorporated by reference in its entirety.

TECHNICAL FIELD

The present disclosure relates to chemical preparation of metal cyanides using Fenton's reagent.

BACKGROUND

Fenton's reagent, first found by English chemist Fenton in 1894, is a kind of oxidation system composed of hydrogen peroxide and catalyst $Fe^{2+}$, in which the $Fe^{2+}$ ion is mainly used as a homogeneous catalyst, while $H_2O_2$ plays the role of oxidant. Fenton's reagent is more widely used in industrial wastewater treatment, especially wastewater which is difficult to deal with or of biological toxicity (such as cyanide contained wastewater), due to its advantages of rapid response, mild reaction condition and no secondary pollution etc. Generally, in acidic conditions, such as pH=3.5, Fenton's reagent has strong oxidative property. Organic compounds, such as carboxylic acids, alcohols, esters etc., can be directly oxidized into carbon dioxide and water (*Journal of hazardous materials*, 2003, 98, 33-50; *Industrial water treatment*, 2014, 3, 22-25). Under the alkaline conditions, Fenton's reagent was also applied in cyanide contained wastewater treatment (*Environmental Toxicology and Chemistry*, 1994, 13, 1719-1726; *Water Treatment Technology*, 2012, 38, 114-117). However, applications of Fenton's reagent in other aspects are rare.

Metal cyanides are compounds that metal ions and cyano are connected directly, which are of hypertoxicity. Cyanide ions may free out after metal cyanides get into the human body, and then combine with ferric iron of cytochrome oxidase, preventing the reduction of ferric. As a result, the normal cell respiration may be disturbed, causing tissue hypoxia and body suffocation. On the other hand, metal cyanides have a wide range of uses. For example, the use of cyanide in industrial mining of gold, silver and organic synthesis (using metal cyanide to synthesis of nitrile). Meanwhile, metal cyanides also play a vital role in electroplating, dye, and paint industrial process.

For hundreds of years, there is only one way to synthesis noble metal cyanides and transition metal cyanides, namely the traditional synthesis method (*J. Chem Soc.* 1943, 79; *J. am. Chem Soc.* 2012, 134, 16387-16400). This method uses NaCN, KCN or HCN as the source and formation of cyano, which react with metal or metal ion directly. In the case of cyanide gold synthesis, the traditional synthesis method is mainly the MacArthur-Forrest process, which is divided into the following two steps:

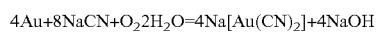

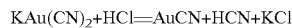

The reaction is related to the free cyanide ion, which is of fatal threat to the environment and human health. Besides, the cyanide ion is easy to combine with the ferric ion to form the iron cyanide, making it difficult to generate other metal cyanide in the presence of iron ions.

In 2012, the inventors established a UV method for metal cyanide preparation (CN 102274740 A). The UV method overcomes the problem of cyanide ion in the traditional technology, but this method uses relatively expensive UV light, easy to produce light pollution, and it is difficult to achieve industrialization. At the same time, the inventors found that it is difficult to control the cyanation degree during gold cyanide preparation through UV method, and the product quality is unstable, and it is difficult to synthesize multi metal cyanide through this UV method. Therefore, the development of a cheap, simple, efficient, green and controllable method for metal cyanides preparation may be of great significance.

SUMMARY

The conventional preparation of Metal cyanides (MCs), however, utilize high toxic NaCN, KCN or HCN as the cyaniding sources, which may threaten human's health and environmental safety. For the purpose of green chemistry, this disclosure is aimed to provide a green method for metal cyanides preparation. For the first time, Fenton's reagent is applied to the cyanation process. It has been proved during this process, the other metal cyanide other than the iron cyanide is surprisingly formed in the presence of iron ions, resulting in breaking certain thinking patterns.

Fenton's reagent is applied to the preparation of metal cyanide for the first time in this disclosure. Through this method, mono-metal cyanide (such as gold cyanide, silver cyanide, palladium cyanide, ruthenium cyanide and platinum cyanide), bi-metal cyanide (such as gold silver cyanide, gold copper cyanide, silver copper cyanide and copper aurocyanide) and tri-metal cyanide (such as gold silver copper cyanide) are obtained. This cyanation process, getting rid of toxic $CN^-$ ions and UV-light, is a green method for metal cyanides preparation.

The specific technical scheme of the disclosure is as follows:

The first aspect of this disclosure relates to a method for metal cyanide preparation, which concludes following steps:

1) supported metal nanoparticles and Fenton's reagent are mixed with nitrile and then stirred to obtain suspension, wherein metal nanoparticles are selected from nano metals, nano metal oxides and nano metal salts, and Fenton's reagent includes Fenton catalyst (metal ion) and hydrogen peroxide;

2) centrifuging the suspension to obtain a product and drying the product after stirring to obtain the metal cyanides.

Cyanation reaction is conducted under neutral environment in this disclosure, namely the pH about 7. If under the acidic environment, cyano may be discharged in the form of hydrocyanic acid, causing environmental pollution; if under the alkaline environment, the metal ion may precipitate out through reacting with hydroxide and the efficiency of hydrogen peroxide may decrease.

In some implementations, the molar ratio of supported metal nanoparticles, metal ions of the Fenton's reagent (e.g., Fenton catalyst), and nitrile is 0.01~0.2:0.01~0.2:100. If the amount of Fenton catalyst is too little, then cyanation is not complete, on the contrary, resulting in waste; the amount of nitrile is too little or too much will reduce the efficiency of hydrogen peroxide. In some instances, the molar ratio of supported metal nanoparticles and Fenton catalyst is 1:1.5~5, which ensures reasonable utilization of raw materials.

In some implementations, supported metal nanoparticles is the complexes of support and metal nanoparticles, and metal nanoparticles are selected from nano metal, nano metal oxide and nano metal salts. The supported metal nanoparticles may be selected from silica, alumina, titania, magnesium oxide, zinc oxide, carbon. In some implementations, the nano metal may be selected from Au, Ag, Pt, Pd, Ru, nano metal oxide is $Ag_2O$, nano metal salt is $AgNO_3$.

In some implementations, nitrile used in this disclosure is acetonitrile or propionitrile, serving as solvent and providing cyano group.

In some implementations, the reaction temperature is 10~70° C., and the reaction time is more than 30 minutes. The longer reaction time causes the higher degree of cyanation and the more complete degree of reaction. The optimal reaction time is 30 minutes to 48 hours. The optimum temperature of the reaction system of the disclosure is 30~50° C. The reaction time is 2 hours or more, and the optimal reaction time is 2 hours to 6 hours. If the temperature is lower than 10° C., the rate of reaction may decrease, resulting in time waste; if the temperature is higher than 70° C., the hydrogen peroxide is decomposed seriously and its utilization efficiency may reduce.

In some implementations, the molar ratio of the Fenton catalyst (metal ion) and hydrogen peroxide in the Fenton's reagent is 1:10~200; In some instances, the molar ratio of the Fenton catalyst (e.g., metal ions) and the hydrogen peroxide in the Fenton's reagent is 1:60~100. During the cyanation reaction, if the molar ratio of the metal ion and hydrogen peroxide is less than 1:200, and part of the cyano group may be oxidized, reducing the utilization of hydrogen peroxide; if the molar ratio of the metal ion and hydrogen peroxide is higher than 1:10, part of metal ions may hydrolyze, reducing their utilization.

In some implementations, the Fenton catalyst may be selected from one or more of $Fe^{2+}$, $Fe^{3+}$, $Ni^{2+}$, $Co^{2+}$, $Mn^{2+}$ and $Cu^{2+}$.

In some implementations, formulas of the wherein metal cyanides may be selected from AuCN, AgCN, $Pt(CN)_4$, $Pd(CN)_2$, $Ru(CN)_4$, $Au_xAg_{1-x}CN$, $Au_xCu_{1-x}CN$, $Ag_xCu_{1-x}CN$, $CuAu_2(CN)_4$, and $Au_xAg_yCu_{1-x-y}CN$, $0<x, y<1$.

In some implementations, the size of wherein said metal cyanides is in nano-scale. In some instances, the metal cyanides are metal nanoparticles.

Advantageous Effects

Advantages of this disclosure are as follows: 1) getting rid of toxic resource, such as NaCN and KCN, which are often used in conventional technic of metal cyanides preparation; 2) no emission of toxic HCN; 3) broadening the application of Fenton's reagent to metal cyanides preparation. Fenton's reagent was applied to the preparation of metal cyanide for the first time in this disclosure. Through this method, a mono-metal cyanide (such as gold cyanide, silver cyanide, palladium cyanide, ruthenium cyanide and platinum cyanide), a bi-metal cyanide (such as gold silver cyanide, gold copper cyanide, silver copper cyanide and copper aurocyanide) and a tri-metal cyanide (such as gold silver copper cyanide) may be obtained. 4) Using the green and cheap raw material (nitril and Fenton's reagent) and providing an one-step method for metal cyanides preparation, which can be simply conducted under normal conditions, especially easy to achieve industrialization; 5) using the normal supported metal nanoparticles to synthesize the metal cyanides whose particle sizes are controllable; 6) by using green resource and undergoing energy saving pathway, this cyanation method is proved to be environment friendly; 7) breaking a certain thinking pattern, and other metal cyanides (especially the multi metal cyanide) other than the iron cyanide may be formed in the presence of iron ions.

As prepared metal cyanides have broad application prospects in the fields of sensing, battery, medicine, electroplating and catalysis. For example, gold cyanides can be used to catalyze synthesis of isoflavones, and copper aurocyanide can be used for ammonia gas sensor.

DETAILED DESCRIPTION OF THE PREFERRED EMBODIMENTS

EXAMPLES

Further elaboration of the present disclosure combined with specific examples are as follows. To be understood, these Examples are only to illustrate the present disclosure and not to limit the scope of the present disclosure. In addition to be understood, after reading the contents of the teaching of the disclosure, a variety of changes or modifications on disclosure can be made by the technicians in this field, which equivalent forms also falls in the defined range in the appended claims.

Example 1

Figure 1:
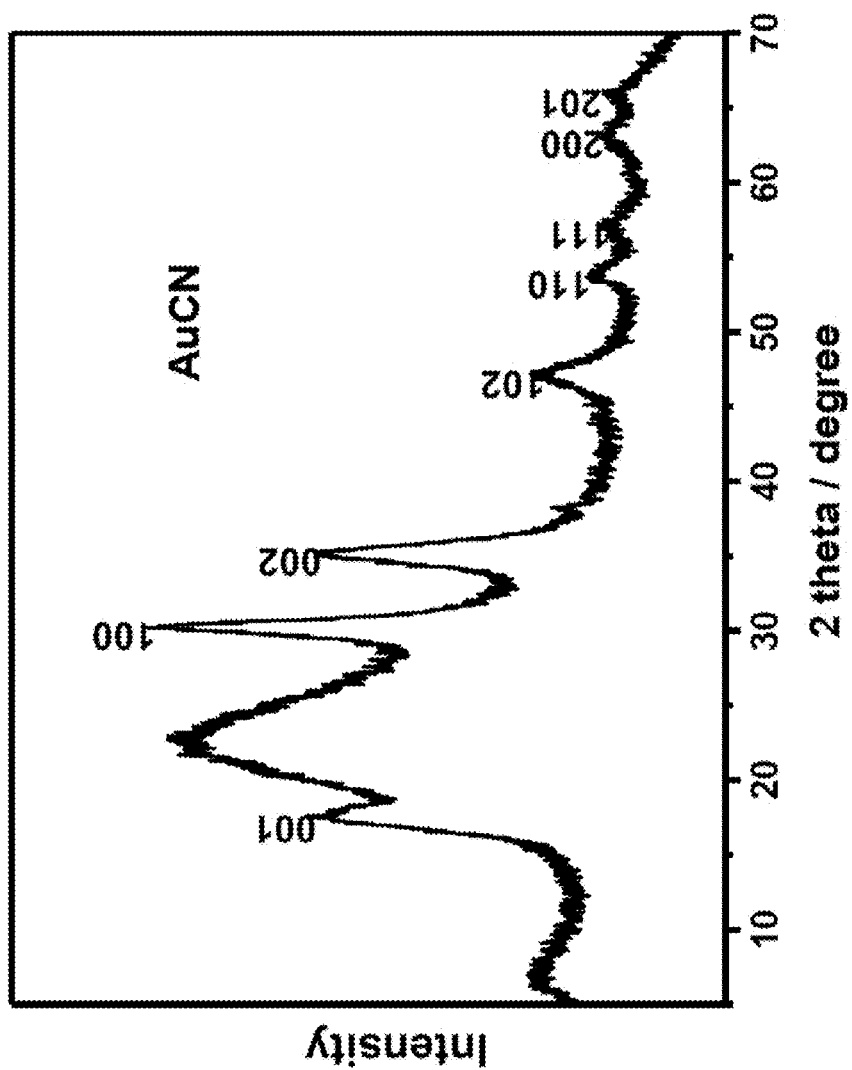
FIG. 1 illustrates a XRD pattern of example 1 related to AuCN preparation.

0.8 mg silica supported Au nanoparticles ($AuNPs/SiO_2$) and 22 mg $FeSO_4.7H_2O$ were suspended in 2 mL acetonitrile containing 0.8 mmol $H_2O_2$ aqueous solution in air under stirring at 30° C. After 4 h of reaction, a visual color of the suspension was gradually changed from wine red to pale green, and the solid product was obtained by centrifuging and drying, which was proved to be silica supported AuCN. FIG. 1 is a XRD pattern related to AuCN preparation, which shows the solid product was pure AuCN. AuNPs were fully transformed to AuCN, and no ferricyanide was formed.

Comparative Example 1

0.8 mg $AuNPs/SiO_2$ and 22 mg $FeSO_4.7H_2O$ were suspended in 2 mL acetonitrile containing 0.8 mmol $H_2O_2$ and 50 uL 1 mol/L HCl aqueous solution in air under stirring at 30° C. After 10 h of reaction, no AuCN was formed with the solid color unchanged, indicating that AuCN cannot be prepared through this method under an acid solution.

Comparative Example 2

Figure 2:
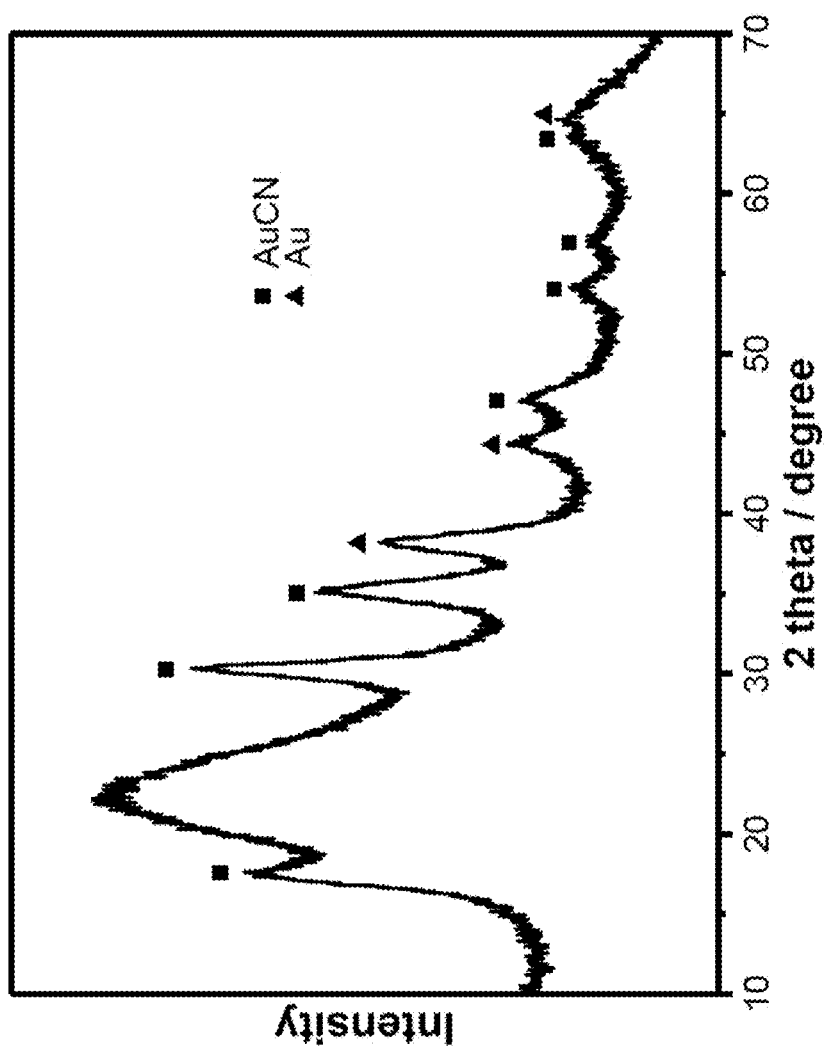
FIG. 2 illustrates a XRD pattern of comparative example 2 related to Au—AuCN complex preparation.

0.8 mg AuNPs/SiO$_2$ and 22 mg FeSO$_4$.7H$_2$O were suspended in 2 mL acetonitrile containing 0.8 mmol H$_2$O$_2$ and 50 uL 1 mol/L NaOH aqueous solution in air under stirring at 30° C. After 10 h of reaction, the visual color of the solid was gradually changed from wine red to deep blue. The solid product was obtained by centrifuging and drying, which was proved to be Au—AuCN complex with AuNPs partially transformed to AuCN. FIG. 2 is a XRD pattern related to Au—AuCN complex preparation. This result indicated that the efficiency of Fenton's reagent decreased under a base solution and AuNPs may not be completely transformed to AuCN.

Comparative Example 3

UV Method for Metal Cyanide Preparation, CN 102274740 A, which is Incorporated Herein by Reference 0.8 mg AuNPs/SiO$_2$ and 22 mg FeSO$_4$.7H$_2$O were suspended in 2 mL acetonitrile containing 0.8 mmol H$_2$O$_2$ aqueous solution under stirring with UV irradiation of 350 W mercury lamp. After 3 h of reaction, the visual color of the solid was gradually changed from wine red to yellow. Au$^{3+}$ was detected on the surface of the obtained product by XPS characterization, indicating the metal Au is over oxidation. No iron cyanide was detected.

Example 2

Figure 3:
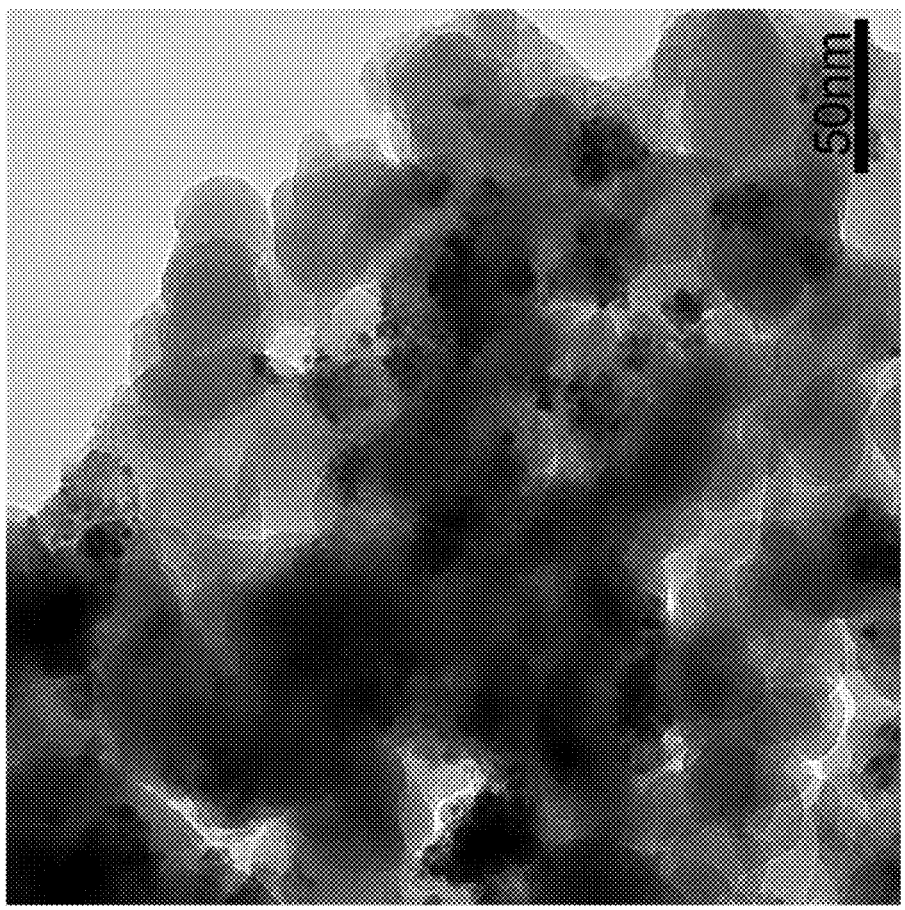
FIG. 3 illustrates a TEM picture of example 2 related to AuCN preparation.

2 mg AuNPs/SiO$_2$ and 3 mg FeSO$_4$.7H$_2$O were suspended in 3 mL acetonitrile containing 1 mmol H$_2$O$_2$ aqueous solution in air under stirring at 70° C. After 30 min of reaction, the visual color of the solid was gradually changed from wine red to pale green. The solid product was obtained by centrifuging and drying, which was proved to be silica supported AuCN. FIG. 3 is the TEM picture related to AuCN preparation. No iron cyanide was detected.

Example 3

Figure 4:
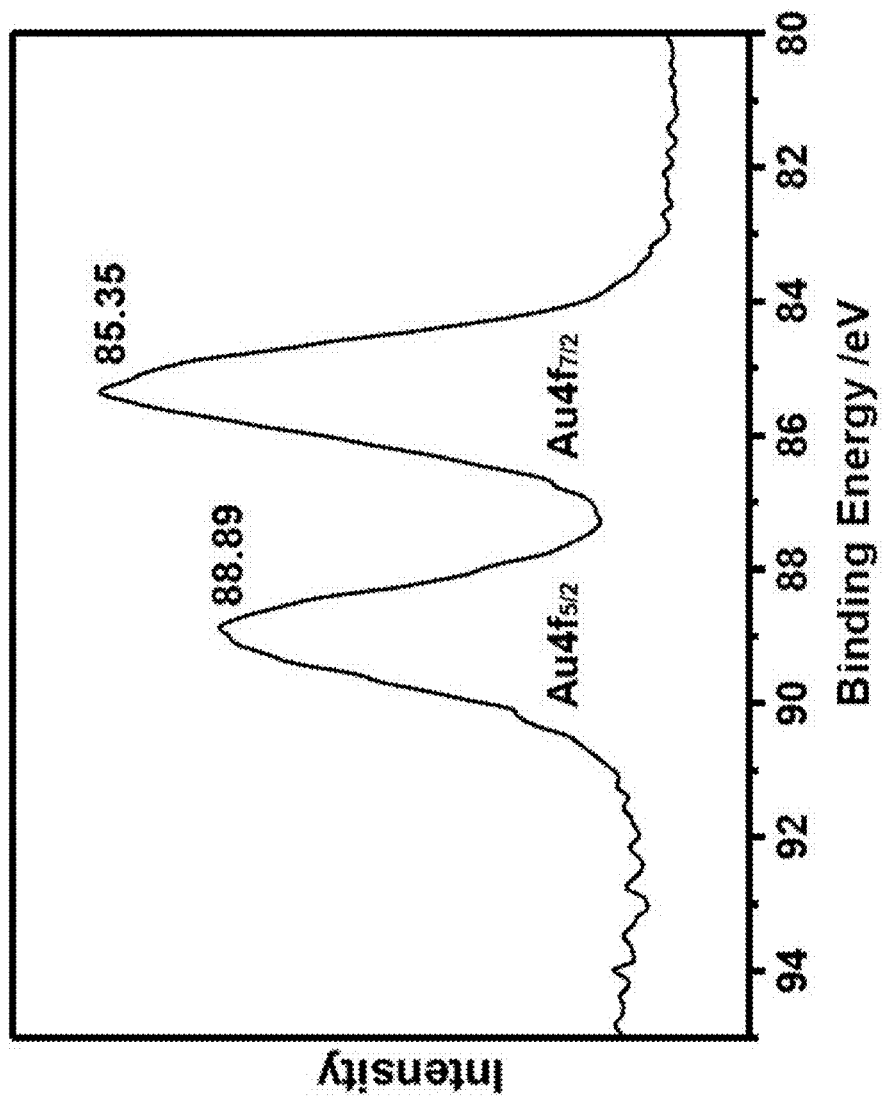
FIG. 4 illustrates a XPS pattern of example 3 related to AuCN preparation.

10 mg AuNPs/SiO$_2$ and 30 mg FeSO$_4$.7H$_2$O were suspended in 1.3 mL acetonitrile containing 21 mmol H$_2$O$_2$ aqueous solution in air under stirring at 10° C. After 48 h of reaction, the visual color of the solid was gradually changed from wine red to pale green. The solid product was obtained by centrifuging and drying, which was proved to be silica supported AuCN. FIG. 4 is the XPS pattern related to AuCN preparation, with two peaks (Au4f$_{5/2}$ and Au4f$_{7/2}$) ascribed to Au(I). No iron cyanide was detected.

Example 4

Figure 5:
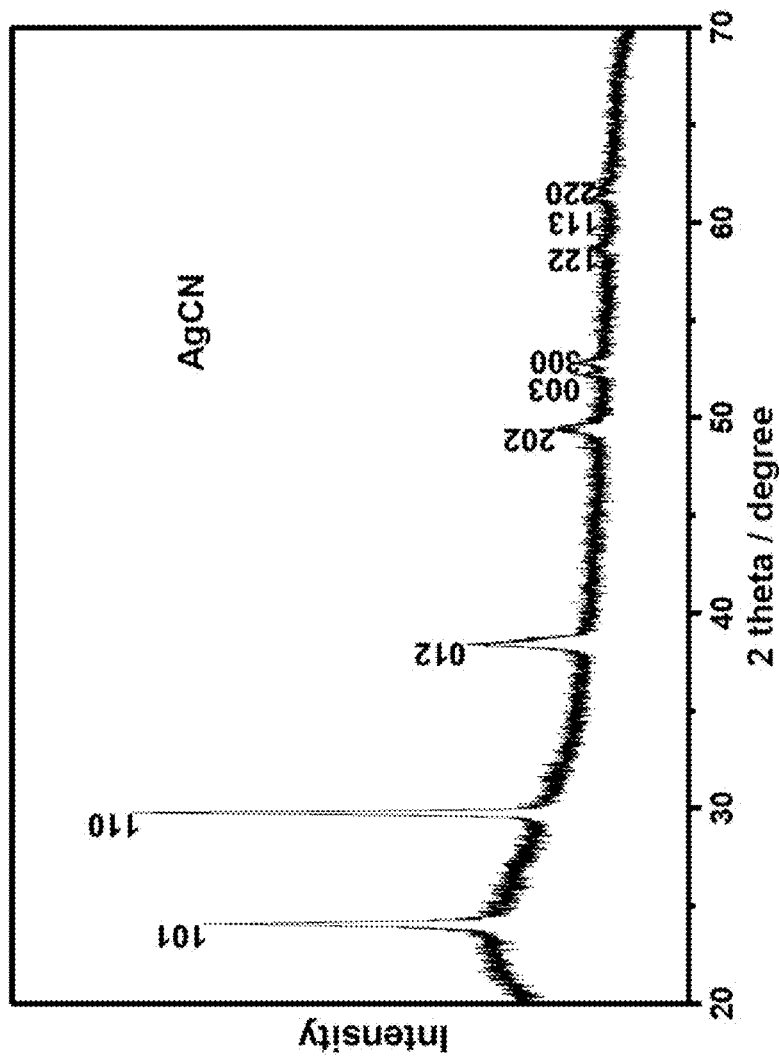
FIG. 5 illustrates a XRD pattern of example 4 related to AgCN preparation.

20 mg AgNO$_3$/MgO and 150 mg FeSO$_4$.7H$_2$O were suspended in 3.5 mL acetonitrile containing 50 mmol H$_2$O$_2$ aqueous solution in air under stirring at 30° C. After 6 h of reaction, the solid product was obtained by centrifuging and drying, which was proved to be MgO supported AgCN (AgCN/MgO). FIG. 5 is the XRD pattern related to AgCN preparation, which showed the solid product was pure AgCN. No iron cyanide was detected.

Example 5

Figure 6:
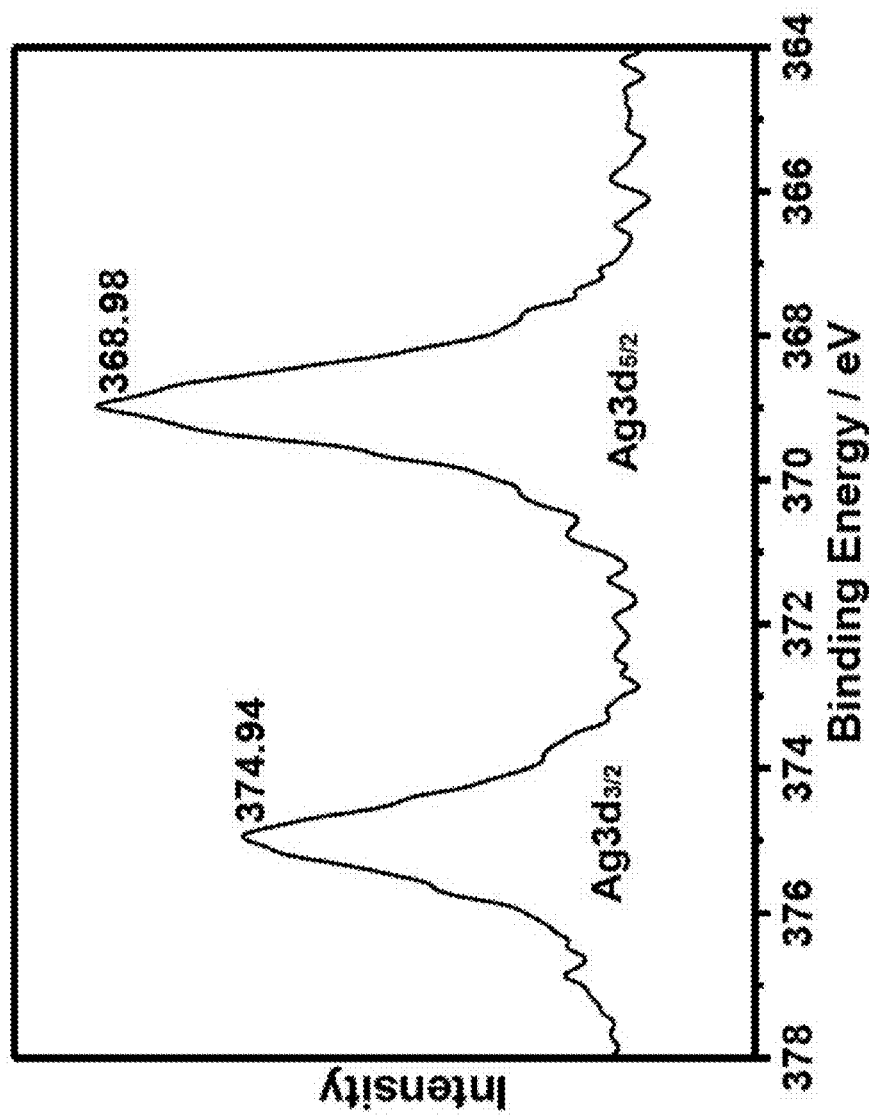
FIG. 6 illustrates a XPS pattern of example 5 related to AgCN preparation.

20 mg AgNPs/ZnO and 100 mg FeSO$_4$.7H$_2$O were suspended in 4 mL acetonitrile containing 72 mmol H$_2$O$_2$ aqueous solution in air under stirring at 50° C. After 2 h of reaction, the visual color of the solid fades gradually. The solid product was obtained by centrifuging and drying, which was proved to be ZnO supported AgCN (AgCN/ZnO). FIG. 6 is the XPS pattern related to AgCN preparation, with two peaks (Ag4f$_{3/2}$ and Ag4f$_{5/2}$) ascribed to Ag(I). No iron cyanide was detected.

Example 6

60 mg active carbon supported Au nanoparticles (AuNPs/C) and 200 mg H$_2$O.Fe$_2$(SO$_4$)$_3$ were suspended in 10 mL propanenitrile containing 150 mmol H$_2$O$_2$ aqueous solution in air under stirring at 10° C. After 48 h of reaction, the visual color of the solid was gradually changed from wine red to pale green. The solid product was obtained by centrifuging and drying, which was proved to be carbon supported AuCN (AuCN/C). No iron cyanide was detected.

Example 7

30 mg titanium oxide supported nano Ag$_2$O (Ag$_2$O/TiO$_2$) and 100 mg FeSO$_4$.7H$_2$O were suspended in 4 mL acetonitrile containing 22 mmol H$_2$O$_2$ aqueous solution in air under stirring at room temperature. After 4 h of reaction, the visual color of the solid was gradually changed from black to grey. The solid product was obtained by centrifuging and drying, which was proved to be titanium oxide supported AgCN (AgCN/TiO$_2$). No iron cyanide was detected.

Example 8

6 mg carbon supported Au nanoparticles (AuNPs/C) and 8 mg FeSO$_4$.7H$_2$O were suspended in 14 mL acetonitrile containing 2.4 mmol H$_2$O$_2$ aqueous solution in air under stirring at 70° C. After 2 h of reaction, the visual color of the solid was gradually changed from wine red to pale green. The solid product was obtained by centrifuging and drying, which was proved to be carbon supported AuCN. No iron cyanide was detected.

Example 9

5 mg supported PtNPs and 20 mg FeSO$_4$.7H$_2$O were suspended in 4 mL acetonitrile containing 6 mmol H$_2$O$_2$ aqueous solution in air under stirring at 50° C. After 20 h of reaction, the solid product was obtained by centrifuging and drying, which was proved to be supported Pt(CN)$_4$. No iron cyanide was detected.

Example 10

5 mg supported PdNPs and 20 mg FeSO$_4$.7H$_2$O were suspended in 4 mL acetonitrile containing 7 mmol H$_2$O$_2$ aqueous solution in air under stirring at 50° C. After 20 h of reaction, the solid product was obtained by centrifuging and drying, which was proved to be carbon supported Pd(CN)$_2$. No iron cyanide was detected.

Example 11

5 mg RuNPs/C and 20 mg FeSO$_4$.7H$_2$O were suspended in 4 mL acetonitrile containing 7 mmol H$_2$O$_2$ aqueous solution in air under stirring at 30° C. After 24 h of reaction, the solid product was obtained by centrifuging and drying, which was proved to be carbon supported $Ru(CN)_4$. No iron cyanide was detected.

Example 12

5 mg supported AuNPs and 12 mg $Ni(NO_3)_2.6H_2O$ were suspended in 4 mL acetonitrile containing 7 mmol $H_2O_2$ aqueous solution in air under stirring at 50° C. After 2 h of reaction, the solid product was obtained by centrifuging and drying, which was proved to be supported AuCN.

Example 13

5 mg supported $AgNO_3$ and 12 mg $Co(NO_3)_2.6H_2O$ were suspended in 4 mL acetonitrile containing 7 mmol $H_2O_2$ aqueous solution in air under stirring at 30° C. After 6 h of reaction, the solid product was obtained by centrifuging and drying, which was proved to be supported AgCN.

Example 14

Figure 7:
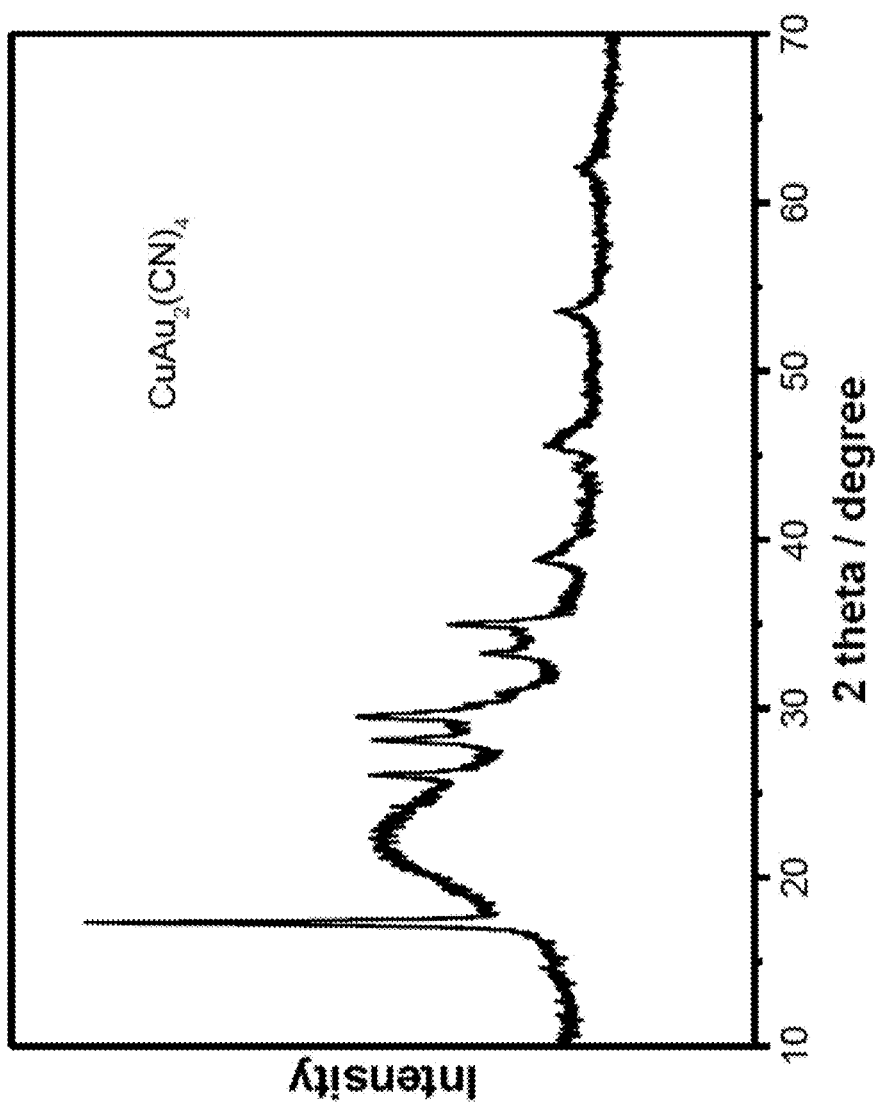
FIG. 7 illustrates a XRD pattern of example 14 related to $CuAu_2(CN)_{4\ preparation}$.

5 mg supported AuNPs and 3 mg $Cu(NO_3)_2.3H_2O$ were suspended in 4 mL acetonitrile containing 7 mmol $H_2O_2$ aqueous solution in air under stirring at 30° C. After 3 h of reaction, the solid product (supported $Au_{2/3}Cu_{1/3}CN$) was obtained by centrifuging and drying. If the reaction time was prolonged to 10 h, supported copper aurocyanide ($CuAu_2(CN)_4$) would be obtained after centrifuging and drying. XRD pattern of copper aurocyanide is shown in FIG. 7.

Example 15

5 mg supported AuNPs and 10 mg $MnSO_4$ were suspended in 4 mL acetonitrile containing 7 mmol $H_2O_2$ aqueous solution in air under stirring at 30° C. After 6 h of reaction, AuCN/C solid product was obtained by centrifuging and drying.

Example 16

Figure 8:
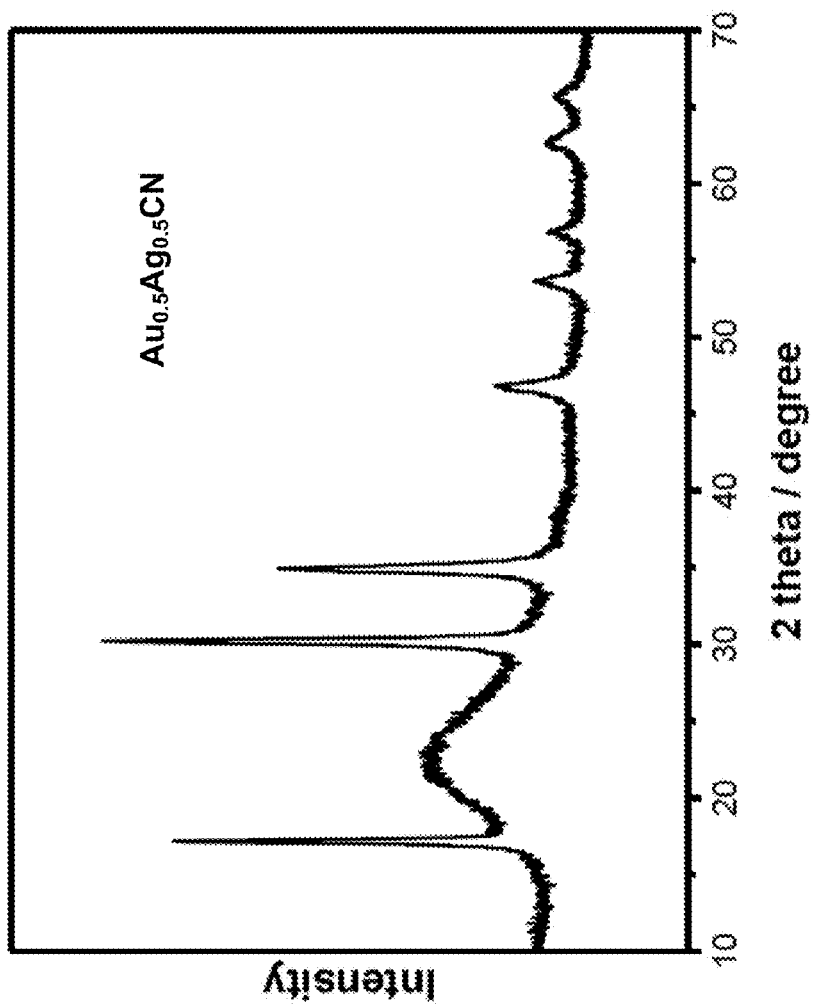
FIG. 8 illustrates a XRD pattern of example 16 related to $Au_{0.5}Ag_{0.5}CN$ preparation.

3 mg $AuNPs/SiO_2$, 2.6 mg supported $AgNO_3$ and 22 mg $FeSO_4.7H_2O$ were suspended in 4 mL acetonitrile containing 0.8 mmol $H_2O_2$ aqueous solution in air under stirring at 30° C. After 4 h of reaction, the visual color of the solid was gradually changed from red to pale grey. The solid product was obtained by centrifuging and drying, which was proved to be silica supported $Au_{0.5}Ag_{0.5}CN$. FIG. 8 is the XRD pattern of as obtained solid product, and it can be assigned to $Au_{0.5}Ag_{0.5}CN$ according to literature (*Journal of The American Chemical Society* 2012, 134, 16387-16400).

Comparative Example 4

UV Method for Metal Cyanide Preparation, CN 102274740 A 3.0 mg $AuNPs/SiO_2$ and 2.6 mg supported $AgNO_3$ were suspended in 4 mL acetonitrile containing 0.8 mmol $H_2O_2$ aqueous solution in air under stirring under UV-irradiation of 350 W mercury lamp. After 4 h of reaction, the visual color of the solid is changed from wine red to green. The solid product was obtained by centrifuging and drying, which was proved to be the mixture of AuCN and AgCN rather than $Au_{0.5}Ag_{0.5}CN$ by XRD characterization.

Example 17

12 mg supported $AgNO_3$ and 13 mg $Cu(NO_3)_2.3H_2O$ were suspended in 4 mL acetonitrile containing 2 mmol $H_2O_2$ aqueous solution in air under stirring at 30° C. After 8 h of reaction, the visual color of the solid was gradually changed from wine red to pale grey. The solid product was obtained by centrifuging and drying, which was proved to be silica supported $Ag_{0.5}Cu_{0.5}CN$ ($Ag_{0.5}Cu_{0.5}CN/SiO_2$).

Comparative Example 5

UV Method for Metal Cyanide Preparation, CN 102274740 A 12 mg supported $AgNO_3$ and 13 mg $Cu(NO_3)_2.3H_2O$ were suspended in 4 mL acetonitrile containing 2 mmol $H_2O_2$ aqueous solution in air under stirring with UV-irridiation of 350 W mercury lamp. After 4 h of reaction, the solid product was obtained by centrifuging and drying. XRD results indicated that AgCN without Ag—Cu bi-metal cyanide was formed.

Example 18

Figure 9:
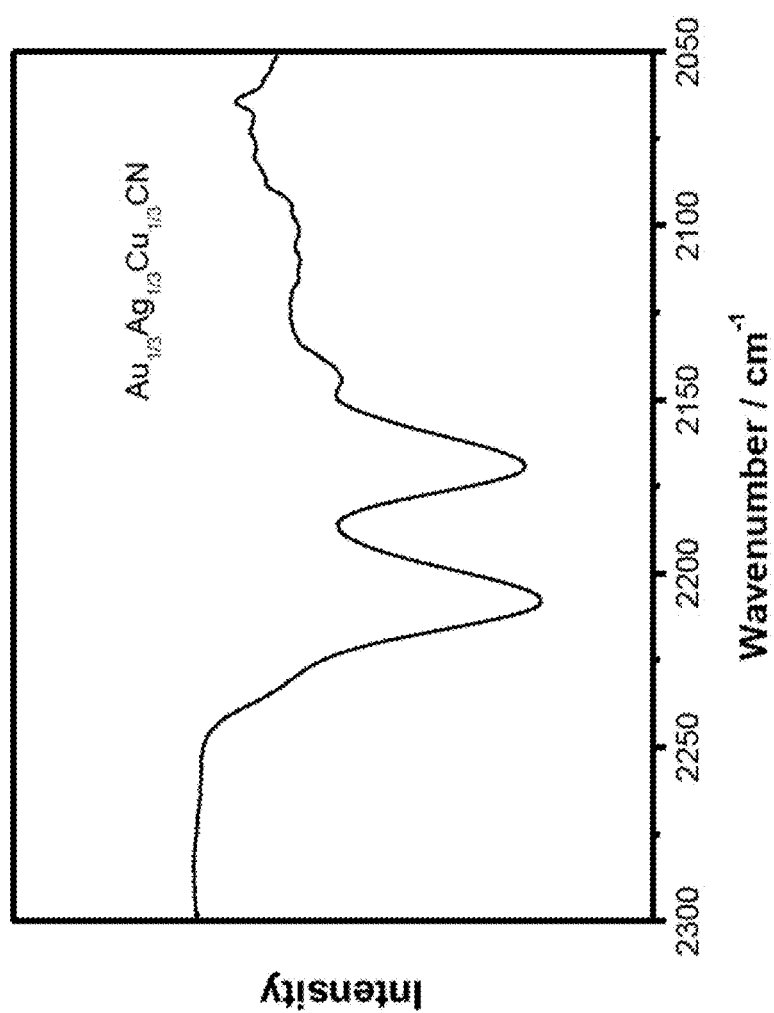
FIG. 9 illustrates a FT-IR spectra of example 18 related to $Au_{1/3}Ag_{1/3}CN$ preparation.

3 mg silica supported AuNPs, 2.6 mg $AgNO_3$ and 4 mg $Cu(NO_3)_2.3H_2O$ were suspended in 5 mL acetonitrile containing 1.5 mmol $H_2O_2$ aqueous solution in air under stirring at 30° C. After 4 h of reaction, the visual color of the solid was gradually changed from red to grass green. The solid product was obtained by centrifuging and drying, which was proved to be silica supported $Au_{1/3}Ag_{1/3}Cu_{1/3}CN$. FIG. 9 is the FT-IR spectra related to $Au_{1/3}Ag_{1/3}Cu_{1/3}CN$ preparation.

Example 19

6 mg silica supported AuNPs, 2.6 mg $AgNO_3$ and 22 mg $FeSO_4.7H_2O$ were suspended in 4 mL acetonitrile containing 1.2 mmol $H_2O_2$ aqueous solution in air under stirring at 30° C. After 7 h of reaction, the visual color of the solid was gradually changed from red to pale grey. The solid product was obtained by centrifuging and drying, which was proved to be silica supported $Au_{2/3}Ag_{1/3}CN$. No iron cyanide was detected.

Example 20

2 mg silica supported $AgNO_3$ and 13 mg $Cu(NO_3)_2.3H_2O$ were suspended in 4 mL acetonitrile containing 2 mmol $H_2O_2$ aqueous solution in air under stirring at 30° C. After 40 h of reaction, the visual color of the solid was gradually changed from red to pale grey. The solid product was obtained by centrifuging and drying, which was proved to be silica supported $Ag_{1/6}Cu_{5/6}CN$ ($Ag_{1/6}Cu_{5/6}CN/SiO_2$).

Example 21

12 mg $AuNPs/SiO_2$, 2.6 mg $AgNO_3$ and 4 mg $Cu(NO_3)_2.3H_2O$ were suspended in 4 mL acetonitrile containing 1.5 mmol $H_2O_2$ aqueous solution in air under stirring at 60° C. After 1 h of reaction, the visual color of the solid was gradually changed from red to grass green. The solid product was obtained by centrifuging and drying, which was proved to be silica supported $Au_{2/3}Ag_{1/6}Cu_{1/6}CN$.

Example 22

6 mg $AuNPs/SiO_2$, 1.3 mg $AgNO_3$ and 8 mg $Ni(NO_3)_2.6H_2O$ were suspended in 4 mL acetonitrile containing 1.2 mmol $H_2O_2$ aqueous solution in air under stirring at 50° C. After 3 h of reaction, the visual color of the solid was gradually changed from red to grey. The solid product was obtained by centrifuging and drying, which was proved to be silica supported $Au_{4/5}Ag_{1/5}CN$.

Example 23

40 mg $AuNPs/SiO_2$ and 100 mg $FeSO_4.7H_2O$ were suspended in 15 mL acetonitrile and 5 mL propionitrile containing 12 mmol $H_2O_2$ aqueous solution in air under stirring at 20° C. After 48 h of reaction, the visual color of the solid was gradually changed from red to grass green. The solid product was obtained by centrifuging and drying, which was proved to be $AuCN/SiO_2$. No iron cyanide was detected.

Example 24

12 mg $PtNPs/SiO_2$ and 80 mg $Co(NO_3)_2.6H_2O$ were suspended in 10 mL acetonitrile containing 5 mmol $H_2O_2$ aqueous solution in air under stirring at 37° C. After 25 h of reaction, the solid product was obtained by centrifuging and drying, which was proved to be silica supported $Pt(CN)_4$ ($Pt(CN)_4/SiO_2$).

What is claimed is:

1. A method of preparation of metal cyanides, the method comprising:
   1) mixing supported metal nanoparticles, Fenton's reagent, and nitrile to obtain suspension and stirring the suspension, the supported metal nanoparticles comprising carriers loading one or more compositions comprising at least one of a nano metal, a nano metal oxide and a nano metal salt;
   2) centrifuging the suspension to obtain a product and drying the product to obtain the metal cyanides.

2. The method of claim 1, wherein a molar ratio of the supported metal nanoparticles, metal ions of the Fenton's reagent, and -nitrile is about 0.01~0.2:0.01~0.2:100.

3. The method of claim 1, wherein the nano metal is selected from Au, Ag, Pt, Pd, and Ru.

4. The method of claim 1, wherein the nitrile of step 1) is acetonitrile or propionitrile.

5. The method of claim 1, wherein a reaction temperature of step 1) is 10~70° C., and a reaction time is more than 30 min.

6. The method of claim 5, wherein a reaction temperature of step 1) is 30~50° C., and a reaction time is more than 2 hours.

7. The method of claim 1, wherein a molar ratio of metal ions of the Fenton's reagent and hydrogen peroxide is 1:10~200.

8. The method of claim 1, wherein a molar ratio of metal ions of the Fenton's reagent and hydrogen peroxide is 1:60~100.

9. The method of claim 1, wherein metal ions of the Fenton's reagent comprise at least one of $Fe^{2+}$, $Fe^{3+}$, $Ni^{2+}$, $Co^{2+}$, $Mn^{2+}$ or $Cu^{2+}$.

10. The method of claim 1, wherein a formula of the metal cyanides is selected from AuCN, AgCN, $Pt(CN)_4$, $Pd(CN)_2$, $Ru(CN)_4$, $Au_xAg_{1-x}CN$, $Au_xCu_{1-x}CN$, $Ag_xCu_{1-x}CN$, $CuAu_2(CN)_4$, and $Au_xAg_yCu1-x-yCN$, wherein 0<x and y<1.

11. The method of claim 1, a size of the metal cyanides is in a nano-scale.

12. The method of claim 1, wherein the nano metal oxide is $Ag_2O$.

13. The method of claim 1, wherein the nano metal salt is $AgNO_3$.

* * * * *